US012658834B2

(12) United States Patent
Rouhana

(10) Patent No.: US 12,658,834 B2
(45) Date of Patent: Jun. 16, 2026

(54) METHOD FOR AUTOMATICALLY SETTING AN ANGULAR POSITION SENSOR

(71) Applicant: SAFRAN ELECTRICAL & POWER, Blagnac (FR)

(72) Inventor: Najib Rouhana, Moissy-Cramayel (FR)

(73) Assignee: SAFRAN ELECTRICAL & POWER, Blagnac (FR)

( * ) Notice: Subject to any disclaimer, the term of this patent is extended or adjusted under 35 U.S.C. 154(b) by 164 days.

(21) Appl. No.: 18/704,987

(22) PCT Filed: Oct. 25, 2022

(86) PCT No.: PCT/FR2022/052026
§ 371 (c)(1),
(2) Date: Apr. 26, 2024

(87) PCT Pub. No.: WO2023/073317
PCT Pub. Date: May 4, 2023

(65) Prior Publication Data
US 2024/0421735 A1      Dec. 19, 2024

(30) Foreign Application Priority Data

Oct. 27, 2021      (FR) ...................................... 2111412

(51) Int. Cl.
*H02P 21/06* (2016.01)
*H02P 21/18* (2016.01)
*H02P 21/22* (2016.01)

(52) U.S. Cl.
CPC .............. *H02P 21/18* (2016.02); *H02P 21/22* (2016.02)

(58) Field of Classification Search
CPC .......... H02P 21/06; H02P 21/18; H02P 21/22; B60L 3/003
See application file for complete search history.

(56) References Cited

U.S. PATENT DOCUMENTS

2008/0272731  A1 *  11/2008  Schulz .................... H02P 21/06
                                                                318/609
2014/0176028  A1 *   6/2014  Tobari ..................... B60L 3/003
                                                                318/400.15

FOREIGN PATENT DOCUMENTS

WO      WO 2011/144457  A1     11/2011

OTHER PUBLICATIONS

International Search Report as issued in International Patent Application No. PCT/FR2022/052026, dated Jan. 17, 2023.

* cited by examiner

*Primary Examiner* — Cortez M Cook
(74) *Attorney, Agent, or Firm* — CUSHMAN PARTNERS, LLC

(57)                ABSTRACT

A method for automatically setting an angular position sensor of a magnet rotor in relation to a stator of a synchronous machine, including an angle error compensator which adjusts the angles measured by the angular position sensor by an angular difference calculated by imposing a direct setpoint current equal to zero and by comparing a setpoint voltage with a quadrature return current, a direct return current resulting from a direct Park transform of current measured at the stator phase outputs and a rotor electrical speed, a predetermined value corresponding to the rotor magnet flux, and a quadrature inductance.

12 Claims, 4 Drawing Sheets

[Fig. 1]
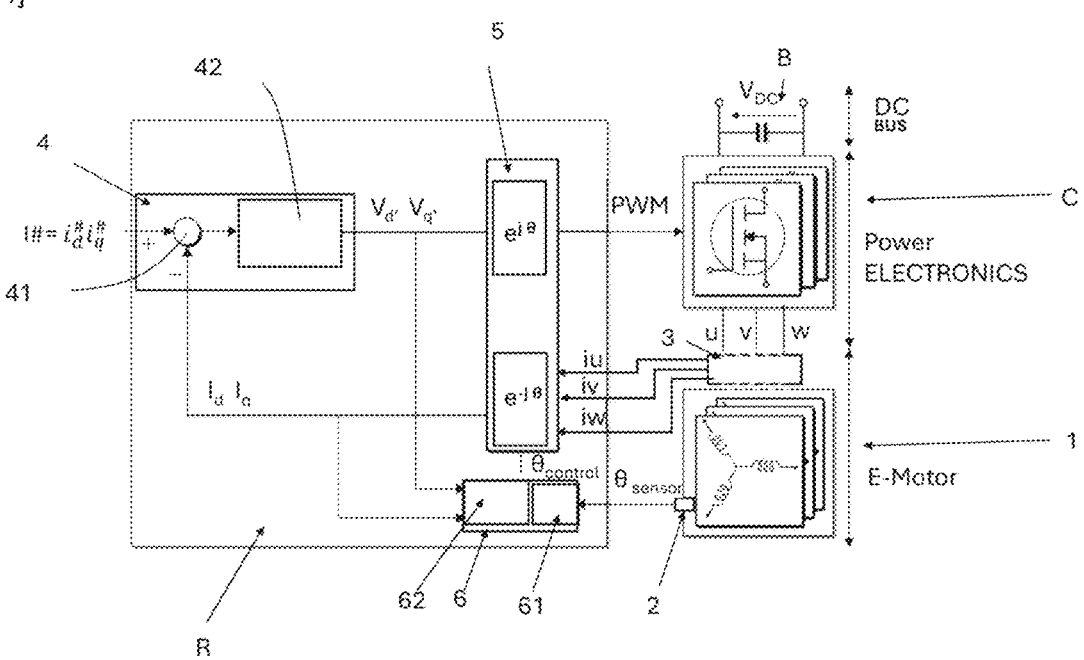
[Fig. 2]
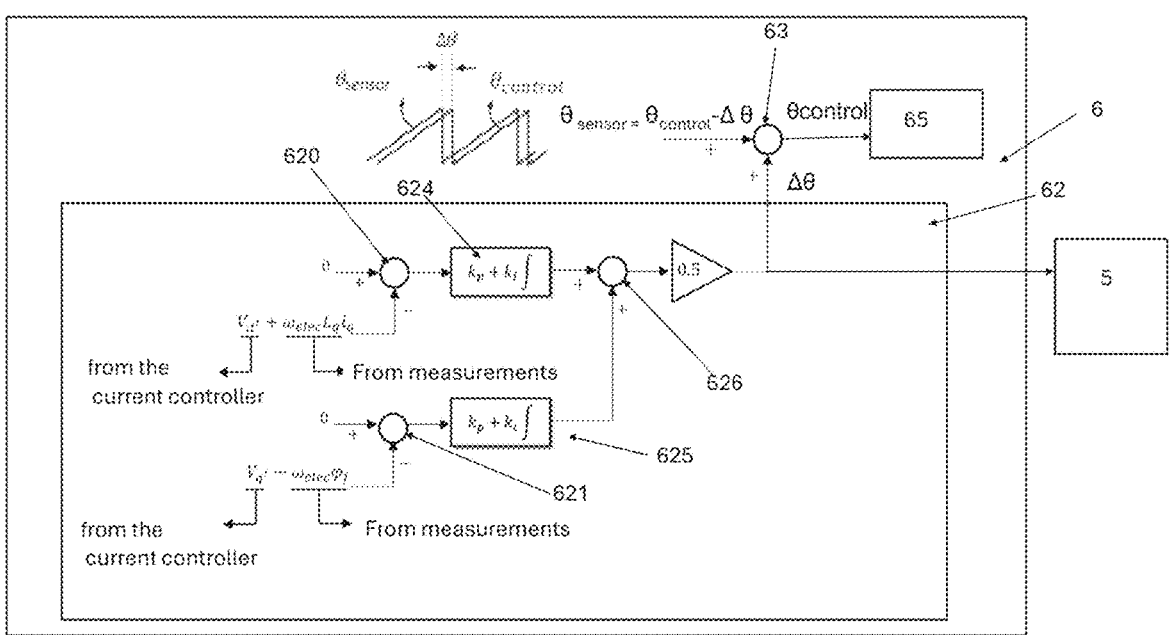

[Fig. 3]
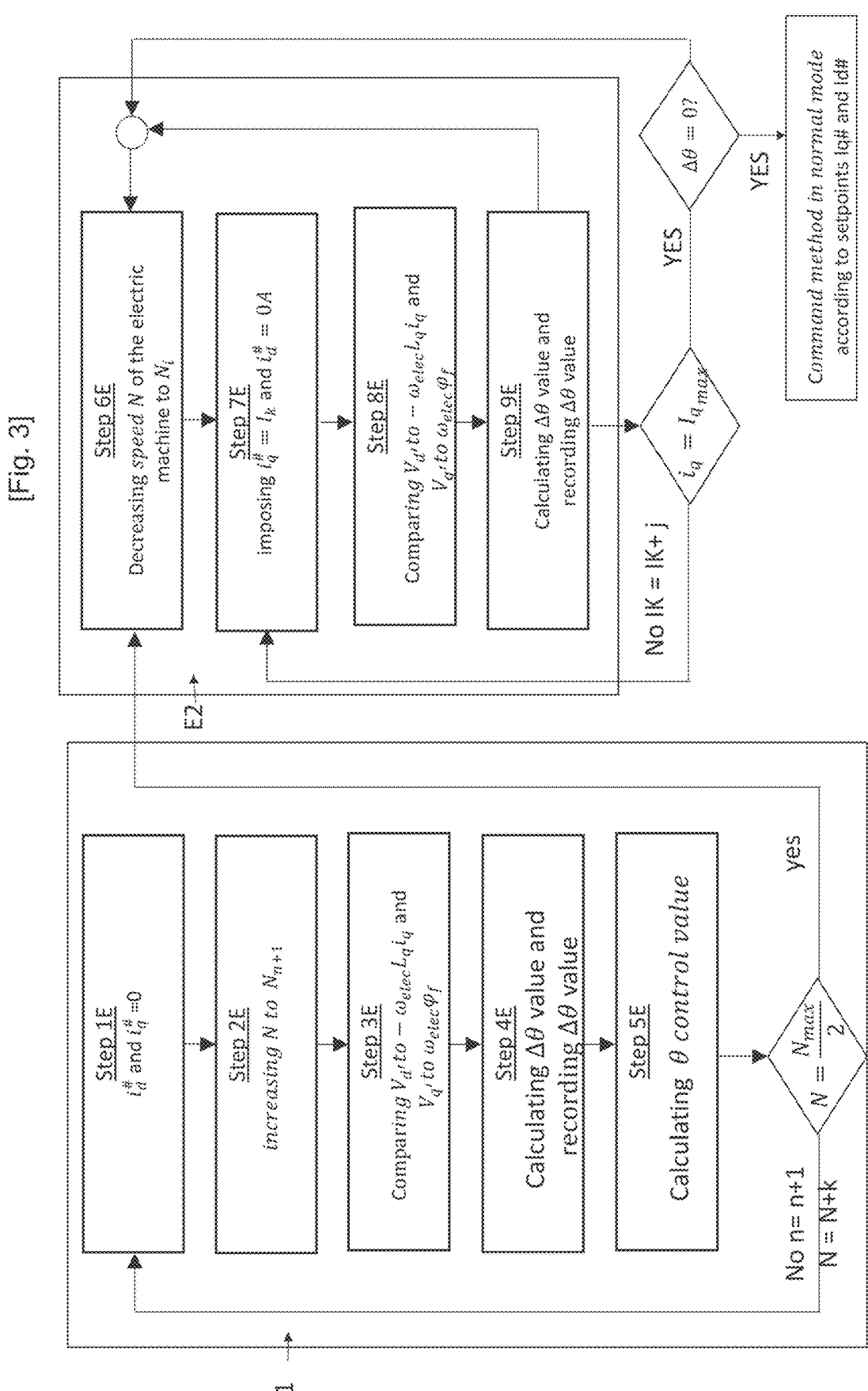

[Fig. 4]

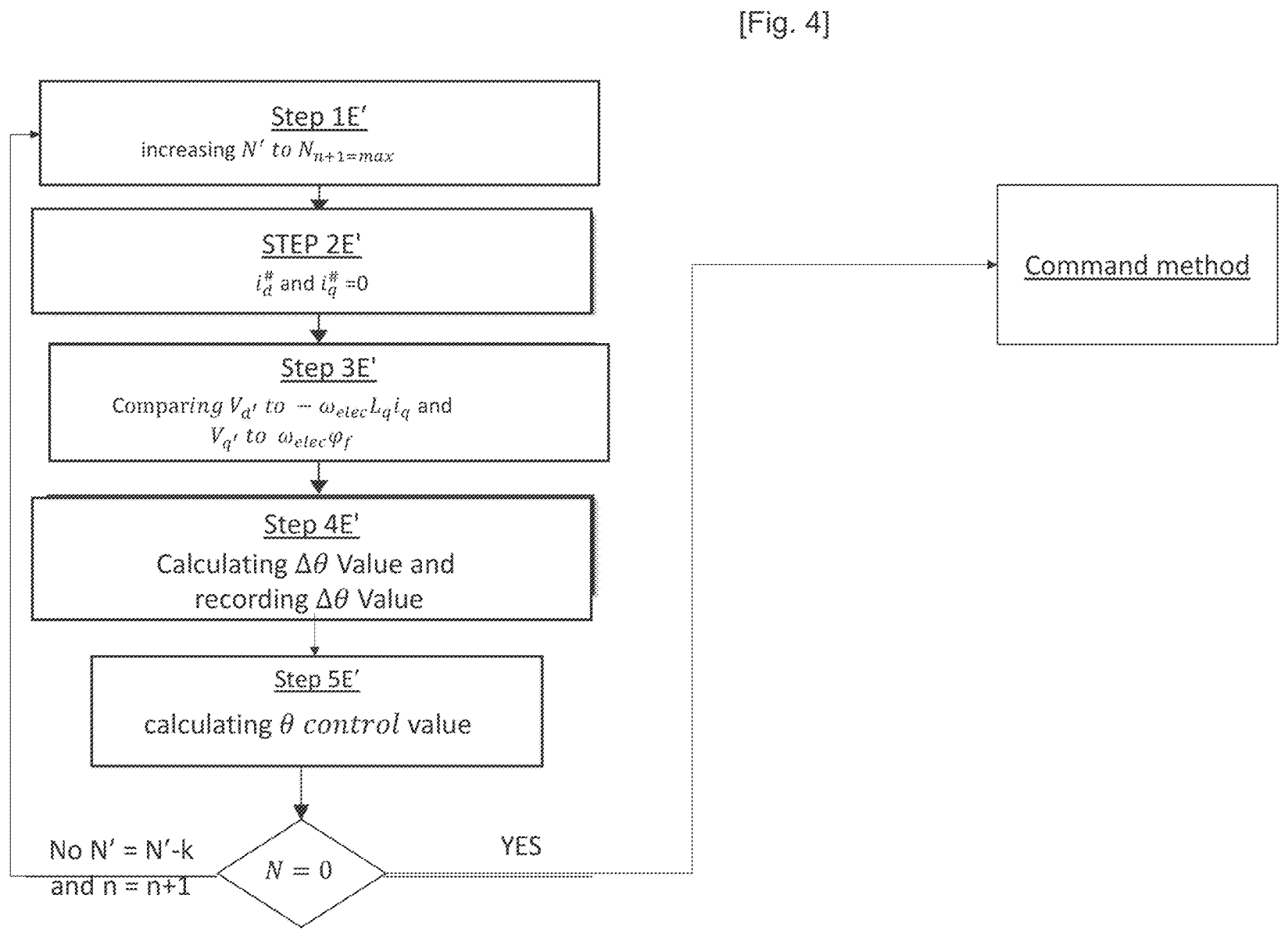

Command method

Step 1E'
increasing $N'$ to $N_{n+1}=max$

STEP 2E'
$i_d^{\#}$ and $i_q^{\#}=0$

Step 3E'
Comparing $V_{d'}$ to $-\omega_{elec}L_q i_q$ and
$V_{q'}$ to $\omega_{elec}\varphi_f$ Step 4E'
Calculating $\Delta\theta$ Value and
recording $\Delta\theta$ Value Step 5E'
calculating $\theta$ control value $N = 0$

YES

No $N' = N'$-k
and n = n+1

[Fig. 5]
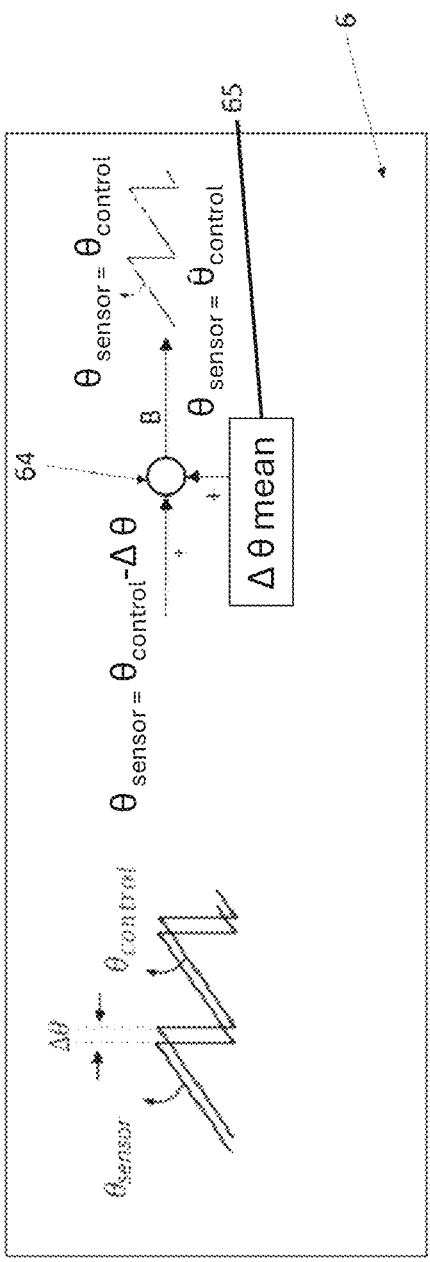

METHOD FOR AUTOMATICALLY SETTING AN ANGULAR POSITION SENSOR

CROSS-REFERENCE TO RELATED APPLICATIONS

This application is the U.S. National Stage of PCT/FR2022/052026, filed Oct. 25, 2022, which in turn claims priority to French patent application number 2111412 filed Oct. 27, 2021. The content of these applications are incorporated herein by reference in their entirety.

TECHNICAL FIELD OF THE INVENTION

The technical field of the invention is that of rotating electric machines provided with an angular position sensor for measuring an angular position of a rotor relative to a stator.

The present invention relates to the initial adjustment of this sensor, for example a resolver or a hall-effect sensor.

TECHNOLOGICAL BACKGROUND OF THE INVENTION

An electric machine is equipped with a field stator comprising windings and a rotor comprising an armature body and a rotation shaft to which a position sensor such as a resolver or hall-effect sensor is mounted. The angular position sensor comprises a fixed part and a movable part mounted to the shaft of the rotor of the electric machine which outputs a set of electrical signals whose relative amplitude characteristics instantaneously reflect angular position of the rotor of the machine.

In a self-controlled electric machine, this signal is used to slave the current in the field stator coilings to holding an optimum (typically quadrature) angular difference between the rotating magnetic field in the stator and the magnetic field generated between the rotor poles.

When the torque is very high, the rotor shaft may slip relative to the rotor body. The initial angular setting of the angle sensor is altered accordingly. In addition, the movable part of the angle sensor can also slip on the rotor shaft, causing an offset in the angular position.

This offset causes a dysfunction in the command of the electric machine. Indeed, in a synchronous machine, for example a three-phase permanent magnet machine, the torque produced depends on interaction between the rotor flux and the stator flux. As the rotor flux is produced by the permanent magnets, the torque is adjusted by adjusting the stator flux, for which two parameters are accessible: amplitude of the flux, itself adjusted by the amplitude of the currents in the three-phase supply system, and phase of the stator flux relative to the rotor flux. This phase is itself adjusted by the phase of the stator currents. At a given current amplitude, the maximum torque is obtained when the rotor flux is more or less in phase quadrature with respect to the stator flux. The amplitude of the currents is slaved by means of controllers that use measurements from current sensors.

To be able to adjust the phase of the stator currents exactly, a motor rotor position sensor is thus needed to know the angular position of the rotor (and therefore of the rotor flux) in relation to the stator coiling. This is the function of the position sensor, for measuring absolute position of its movable part and, if there is no slip between the movable part of the sensor and the rotor poles, the angular position of the machine rotor. A given reference position between the machine rotor and machine stator corresponds to a reference value, for example "zero degrees", for the measurement of the rotor position by the position sensor. For the control of the electric machine and by convention, the "zero degrees" angular reference of the absolute position of the rotor of the machine on one electrical revolution occurs when the rotor poles of the machine are aligned to the respective axes of the coiling of a phase A, i.e. one of the phases of the stator, the spatial position of which is obviously known from construction of the coilings.

In the case of slippage between the movable part of the position sensor and the active part of the rotor, there is a difference between the measurement indication of the position sensor and the reference value of the rotor position. This difference will be referred to as the "position sensor setting error".

It is therefore necessary to know this position sensor setting error in order to know position of the machine rotor flux exactly and therefore to be able to optimise machine control.

One solution is to use a static position error search method consisting in injecting a constant current for example into two phases of the stator coiling. The synchronous electric machine should be idle, i.e. the rotor of the electric machine should be decoupled from the body of the turbomachine propulsion unit, allowing the freely rotating rotor to assume a well-defined balance position, the rotor flux of the magnets aligning naturally with the stator flux thus producing a known predetermined angular position between the rotor and stator. The position sensor measures and transmits the angular position measured, and a calculation unit can thus compare the angular position measured with the predetermined angular position at this balance position of the rotor, and deduce the angular position measurement error between this angular position measurement and the predetermined angular position. The calculation unit can thus calculate, in normal operating mode of the electric machine, an adjusted angle by offsetting the angle measured by the position sensor by this angular position error.

This static position error search method has the drawback of injecting high amplitude static currents into the stator to allow the rotor to rotate in order to obtain the known (reference) rotor angular position, causing significant heating of the coiling and power electronic switches during the error search procedure, which could damage several components (electronics, power electronic switches, coiling, rotor magnet) of the electric machine. In addition, for a multipolar machine with p pole pairs, there are p electrical revolutions per mechanical revolution, so there are as many known angular balance positions as there are pole pairs supplying both phases. It may therefore be necessary to carry out this static position error search method several times, for example by supplying other phases or starting again the same supply of both phases in order to check the angular position error. It is therefore necessary to carry out the static position error search method several times, for several positions, resulting in a very long method.

The purpose of the invention is to correct the position sensor setting error simply, more quickly and with less risk of damage to the various machine elements (electronic switches, coiling, etc.).

SUMMARY OF THE INVENTION

The invention offers a solution to the problems previously discussed, by making it possible to estimate under very specific conditions, while the rotor is rotating, the angular position at a time t of the rotor relative to the stator and to compare this angular position estimated with the angular position measured by the position sensor in order to identify and correct the angular offset which caused the position sensor setting error.

One aspect of the invention relates to a method for automatically setting an angular position sensor measuring an angle corresponding to the mechanical angular position of an armature rotor with a magnet forming P pole pairs with respect to a stator comprising X phases of a multiphase synchronous electric motor of an electric machine of a propulsion unit of an aircraft, the position sensor comprising a movable part mounted to the armature rotor and a fixed part relative to the stator, the method using a control loop to transmit a command to an inverter converter of the electric machine to supply the phases of the stator, the control loop comprising a current controller comprising a setpoint input to receive a current setpoint comprising a quadrature current comprising a component on the quadrature axis of the setpoint current vector and a direct current corresponding to a component on the direct axis of the setpoint current vector and a setpoint direct current for delivering a voltage setpoint comprising a component on the direct axis of the voltage vector and a component on the quadrature axis of the voltage vector, a direct Park and inverse Park calculation unit, for transforming the voltage setpoint into a command of the inverter converter, the method being characterised in that it comprises a speed-based position sensor error identification part, part of which is produced by an angle error compensator, comprising the following steps of:

calculating the command of the inverter converter in order to rotate the armature rotor at a predetermined mechanical speed constantly, measuring the phase currents and transforming them in a Park reference frame, into return quadrature current and return direct current, taking account of an adjusted angle calculated, calculating an electrical rotor speed by multiplying the number p of pole pairs by the predetermined mechanical speed, calculating a voltage setpoint for a period t in which the rotor rotates at the predetermined mechanical speed by imposing a direct current value equal to 0 on the current controller, identifying an offset error of the direct component on its direct axis by comparing, during the period t, the direct voltage of the voltage setpoint with a value of opposite sign, the value being equal to the electrical speed calculated multiplied by a quadrature inductance multiplied by the return quadrature current, identifying an offset error of the quadrature component on its quadrature axis by comparing, during the period t, the quadrature voltage of the voltage setpoint with a first value equal to the calculated electrical speed of the rotor multiplied by a predetermined value corresponding to the flux of the rotor magnets, calculating an angular difference value from these direct and quadrature angular offset errors identified, determining at period t, an angle adjusted as a function of the angular difference value calculated, and the value of the angle measured, transmitting the return quadrature current and the return direct current according to the adjusted angle to the current controller.

By virtue of the invention, the method provides a command law that identifies the presence of an error between the actual angular position of the rotor of the electric machine and between the angular position that is used in the current control loop of the electric machine in a condition where the setpoint direct current is equal to zero.

Indeed, when the direct current is equal to zero, and if the position sensor has no error in positioning its zero angle with respect to the rotor, the direct voltage at the output of the controller $V_{d'}$ comprises a value equal to $-\omega_{elec}L_q i_q$ and $V_{q'}$ comprises a value equal to $\omega_{elec\varphi f}$. Thus by imposing the component of the current vector on the direct current axis noted $i_d$ as equal to zero, if there is a position measurement offset between the sensor and the rotor, the angular position has no impact on the motor torque, the motor torque is therefore controlled by the component of the current vector on the quadrature axis, noted $i_q$. Imposing a direct current equal to 0 on the controller therefore makes it possible, in the event of a measurement error, to identify the positioning error and adjust positioning to converge the component on the direct axis of the voltage vector towards its actual value equal to $-\omega_{elec}L_q i_q$ and to converge the component on the quadrature axis of the voltage vector $V_{q'}$ towards its actual value $\omega_{elec\varphi f}$.

Furthermore, such a method operates in both directions of rotation of the electric machine, whether in the positive (anticlockwise) or negative (clockwise) direction.

In addition to the characteristics just discussed in the preceding paragraph, the method according to one aspect of the invention may have one or more additional characteristics from among the following, considered individually or according to any technically possible combinations:

According to one embodiment, the position sensor is a resolver.

According to another embodiment, the position sensor is a hall-effect sensor.

According to one embodiment, the angular difference value ($\Delta\theta$) is calculated according to this formula:

$$\Delta\theta = \frac{1}{2}\left[\left(k_p + \frac{k_i}{s}\right)\varepsilon_d + \left(k_p + \frac{k_i}{s}\right)\varepsilon_q\right]$$

with $\varepsilon_d = \omega_{elec}L_q i_q + V_{d'}$ corresponding to the comparison to identify angular error of the direct component and $\varepsilon_q = -\omega_{elec\varphi f} + V_{q'}$, corresponding to the comparison to identify angular error of the quadrature component, Lq is the quadrature inductance, $k_p$, $k_i$ are the gains of the proportional integral type corrector used to cancel the error between the setpoint quadrature current and the return quadrature current and the setpoint direct current and the return direct current, respectively.

According to one embodiment, the rotor is coupled to a shaft of the propulsion unit comprising a moment of inertia, wherein during the period t, the value of the direct voltage is imposed to be equal to 0.

According to one embodiment, the rotor is coupled to a body of a turbomachine, and in that the speed-based position sensor calibration part is started again a number X times at different predetermined speeds and in that each time a speed-based position sensor calibration part is carried out, the value of the angular difference between the angle adjusted and the angle measured and the corresponding predetermined speed is recorded.

According to one example of this embodiment, the first predetermined mechanical speed is the highest of the predetermined speeds, for example the maximum speed of rotation of the rotor, and in that the method starts again the speed-based position sensor calibration part by reducing the mechanical speed of the rotor by a predetermined difference until the rotor stops rotating.

According to another embodiment different from the preceding one, the electric machine can run idle, for example by disengaging from a turbomachine shaft, the method comprises:

in the step of calculating a command of the inverter converter of the speed-based position sensor error identification part, the predetermined mechanical speed of rotation is incremented in a predetermined manner each time the method starts again the speed-based position sensor error identification part, in the speed-based position sensor error identification part, a step of recording each angular difference value between the adjusted angle value calculated and the angle measured.

According to one example of this embodiment, the method also comprises, after the speed-based position sensor calibration part, a current-based angular position sensor setting checking part, comprising the following steps of:

calculating a command of the inverter converter to supply the X phases in order to rotate the armature rotor at a second predetermined mechanical speed constantly, measuring the phase currents and transforming them in a Park reference frame, into a return quadrature current and a return direct current, taking account of the value calculated of the adjusted angle, calculating an electrical speed of the rotor by multiplying the number of pole pairs by the second predetermined mechanical speed, imposing on the predetermined mechanical speed, at the input of a current controller, a setpoint quadrature current to a first predetermined value other than zero, and a direct setpoint current to a zero value, determining the quadrature inductance, comparing at the second predetermined speed constantly, that at the output of the current controller, the value of the direct setpoint voltage is equal to a value of opposite sign, the value being equal to the product of the electrical speed calculated, the quadrature inductance and the return quadrature current, comparing at the second predetermined mechanical speed constantly, that at the output of the current controller, the value of the quadrature setpoint voltage is equal to the product of the electrical speed calculated times the predetermined value corresponding to the flux of the rotor magnets, calculating the angular difference between the adjusted angle calculated and the angle measured, while the rotor is rotating at the second predetermined mechanical speed constantly as a function of these comparisons, and recording it, wherein the automatic setting method repeats the current-based angular position sensor setting verification part a predetermined number of times, each time incrementing the predetermined setpoint quadrature current value in a predetermined manner until a predetermined maximum return quadrature current value is obtained.

According to one embodiment, the command is calculated by calculating the speed according to the position measurements by the position sensor, and the current measurements, According to one embodiment, the method comprises a step of determining the quadrature inductance from the values of the direct and quadrature components of the measured current Id and Iq and from predetermined mappings of the machine.

Another aspect of the invention relates to a method for commanding an electric machine of a turbomachine, wherein, each time the electric machine is started up, the method comprises the method for automatically setting an angular position sensor described above with or without the characteristics of the embodiments described above, and wherein the method further comprises a normal mode of commanding the electric motor comprising a step of calculating the command of the inverter converter to supply the phases of the stator of the electric motor according to the received setpoint of the values of return quadrature current and return direct current, the calculation unit performing calculations by the mathematical method of the direct or inverse Park transform, according to an angle B comprising the measured angle added to a correction value according to a recorded angular difference.

According to one embodiment, the correction value may be equal to the angular difference value calculated recorded corresponding to the predetermined mechanical speed recorded closest to the instantaneous mechanical speed measured.

According to another embodiment, the method further comprises a step of calculating a mean of the angular difference values recorded and wherein the correction value is equal to the mean of the recorded angular difference values.

Another aspect of the invention relates to a control loop of an electric machine of a turbomachine to calculate a command of an inverter converter for an electric motor comprising a field stator having stator coilings forming X phases, an armature rotor with a magnet having p pole pairs and a shaft to be coupled to a turbomachine body, an inverter converter comprising a command input and outputs each connected to one of the X phases for commanding the electric motor, a means of measuring the current delivered on the X phases and a position sensor comprising a rotatably movable part mounted integral with the rotor shaft and a fixed part integral with the stator, the control loop being configured to carry out the method for commanding a turbomachine comprising an electric machine, according to the preceding aspect of the invention with or without the different characteristics of one of the two embodiments described above, to calculate a command of the inverter converter, the control loop comprising:

a current controller comprising:

a direct and quadrature current setpoint input, a direct and quadrature current return input, a voltage setpoint output, a calculation unit for performing an inverse Park transformation comprising:

a direct and quadrature voltage setpoint input, connected to the voltage setpoint output of the current controller, a measured current input, connected to the measurement means, an adjusted angular position input, a current return output for outputting a return quadrature current and a return direct current, the current return output being connected to the return input of the current controller, a command output to be connected to the command input of the inverter converter, an angle error compensator, comprising:

a measurement input to be connected to the angle measurement sensor, a current return input, connected to the current return output of the calculation unit to receive the return quadrature current and the return direct current, a voltage setpoint input connected to the voltage setpoint output of the controller to receive the direct and quadrature setpoint voltage, an adjusted angle output connected to the adjusted angular position input of the calculation unit, an adjusted angle calculator configured to:

calculate an angular difference value as a function of the current measurements and the voltage setpoint and rotor speed, to identify on the one hand the angular error on the direct axis and on the other hand the angular error on the quadrature axis, calculate an adjusted angle from the angular difference value as a function of the comparisons.

The current controller is thus configured to transform a setpoint comprising a setpoint quadrature current and a setpoint direct current received at its setpoint input, into a voltage setpoint comprising a quadrature and direct voltage with an angle at its setpoint output according to the return quadrature current and quadrature return direct current received at its return input.

The calculation unit which can perform the Park and inverse Park transformation, being configured to:

transform measured currents received at the measured current input into a quadrature current and a direct current in a Park reference frame, according to the value of the adjusted angle, and output this quadrature current and this direct current at its return output, transform an inverse Park transformation on a quadrature and direct voltage received at the voltage setpoint input to transmit at the control output a pulse width modulation command to the inverter converter in order to supply the stator coilings of the main stator.

The angle error compensator can be configured to compare, during the period t, the direct voltage of the voltage setpoint with a value of opposite sign, the value being equal to the electrical speed calculated multiplied by a quadrature inductance multiplied by the quadrature return current, and to compare the quadrature voltage of the voltage setpoint with a first value equal to the calculated electrical speed of the rotor multiplied by a predetermined value corresponding to the flux of the rotor magnets.

Another aspect of the invention relates to an electric machine comprising the rotor, the stator, the position sensor and the inverter converter comprising a command input and outputs each connected to one of the X phases to command the electric motor and the control loop.

The invention and its different applications will be better understood upon reading the following description and upon examining the accompanying figures.

BRIEF DESCRIPTION OF THE FIGURES

The figures are set forth by way of indicating and in no way limiting purposes of the invention.

FIG. 1 shows a representation of a block diagram with functional blocks of an electric machine for implementing the invention.

FIG. 2 shows a schematic representation of a calculation law for calculating an adjusted angle in order to carry out a method for automatically setting an angular position sensor according to one example of one embodiment of the invention.

FIG. 3 shows a schematic representation of a method for automatically setting an angular position sensor according to one example of a first embodiment of the invention.

FIG. 4 shows a schematic representation of a method for automatically setting an angular position sensor according to one example of a second embodiment of the invention.

FIG. 5 shows an example of calculating an angle B.

DETAILED DESCRIPTION

The figures are set forth by way of indicating and in no way limiting purposes of the invention.

FIG. 1 represents an electric machine M of a turbomachine, comprising an electric motor 1 comprising a stator comprising X phases, a rotor surrounded by the stator. The electric machine M also includes an angular position sensor 2 for measuring the position of the rotor relative to the stator. The electric motor 1 can operate in a motor mode and/or in a generator mode. The electric machine M is a multiphase synchronous electric machine of an aircraft propulsion unit.

The rotor comprises a shaft and an active part mounted to the shaft. The active part of the rotor comprises magnets forming P pole pairs. The angular position sensor 2 comprises a movable part mounted to the rotor shaft and rotatably integral with the rotor shaft, and a fixed part mounted to a fixed part of the electric motor integral with the stator, for example a bearing of the electric motor 1.

The position sensor 2 may be a resolver or a hall-effect sensor.

The number X in this example is three, but could be greater, for example five or six. In this example, the stator therefore comprises three coilings forming three phase outputs U, V, W of three phases which are represented in FIG. 1 as star-coupled but could, for example, be delta-coupled.

The electric machine M further comprises an inverter converter C for supplying the X phases and a control loop R for implementing a method for automatically setting the angular position sensor 2 relative to the rotor according to a first and a second embodiment explained below.

In this example, the inverter converter C is an inverter with a DC voltage input source, i.e. a DC/AC converter, but could also be an inverter converter with an AC voltage input source (i.e. an AC/AC inverter converter) or even a reversible inverter converter, i.e. AC/DC and DC/AC, if the electric machine M also allows generator mode. The inverter converter C comprises N outputs, herein three outputs each connected to one of the corresponding phase outputs U, V, W. The inverter C also comprises power inputs, herein two DC voltage inputs connected to the terminals of a DC voltage bus B. The inverter converter C comprises electronic power switches and a setpoint input, herein pulse width modulation to supply the electronic power switches and thus vary in motor mode the electrical supply to the stator phases to vary the speed and torque of the rotor of the electric motor 1.

The electric machine M further comprises a measurement means 3 for measuring phase currents Iu, Iv, Iw flowing on the phase outputs U, V, W.

The control loop R comprises a controller 4 comprising a direct current Id # and quadrature current Iq #setpoint input, hereinafter referred to as the setpoint I #. The setpoint I #may come from a propulsion unit control unit or from several propulsion units transmitting the setpoint I #in direct currents Id #and quadrature current Iq #at an angle a to the controller 4. The controller 4 comprises a voltage setpoint output V' comprising a direct setpoint voltage Vd' and a quadrature setpoint voltage Vq', the calculations of which are explained below.

The control loop R further comprises a calculation unit 5 using a known mathematical method, namely the so-called direct "Park" transform to shift from a three-phase reference frame U; V; W related to the stator to a two-phase rotating (DQ) reference frame d; q, also knowing the angular position θ of the rotor of the electric motor 1 relative to its stator, as well as the inverse Park transform to shift from the Park reference frame d; q to the three-phase reference frame U; V; W, also using an angular position of the rotor. The calculation unit 5 comprises a voltage setpoint input connected to the voltage setpoint output of the controller 4 to receive the voltage setpoint V', an inverse transformation and command calculator, and a command output connected to the command input of the inverter converter C, to transmit the PWM control calculated by the direct transformation calculator, herein pulse width modulation. The inverse Park transformation and command calculator is therefore configured to transform the vectors of the direct and quadrature setpoint voltages Vd', Vq' in a Park plane from an adjusted angle θcontrol explained in the following, into a pulse width modulation PWM command. The pulse width modulation PWM command comprises electric voltage signals, to command each phase in pulse width modulation and thereby generate a balanced three-phase AC voltage system.

The calculation unit 5 further comprises measured current inputs receiving the phase currents iu, iv, iw measured, the measured current inputs are connected to the measurement means 3, and a quadrature Iq and direct Id current return output connected to the return input of the current controller 4.

The calculation unit 5 further comprises an adjusted angular position input receiving an adjusted angle θcontrol and a Park transformer calculator configured to transform the measured currents Iu, Iv, Iw according to the adjusted angle θcontrol received at the adjusted angle input into component on the quadrature axis of the current vector referred to in the following as the quadrature current Iq, and component on the direct axis of the direct current vector Id in a Park plane (D,Q), also referred to in the following as the return direct current Id.

The return direct current Id is therefore the direct component of the stator current in the Park plane calculated from the stator currents measured.

The return quadrature current Iq is therefore the quadrature component of the stator current in the Park plane calculated from the measured stator currents.

The current controller 4 comprises summers 41 (represented by a single summer in FIG. 1), receiving at the non-inverting input the setpoint quadrature current vector Iq #and the setpoint direct current vector Id #and at the inverting input the return quadrature current vector Iq as well as the return direct current vector Id.

At the output of the summers 41, the controller 4 has a line on which the quadrature current difference flows between the quadrature setpoint current Iq #and the return quadrature current Iq flows, as well as another line on which the direct current difference flows between the direct setpoint current Id #and the return direct current Iq flow. The two lines are represented by a single line. The current controller 4 comprises PI (proportional integral) current controllers 42 connected to the current difference lines and delivering voltages Vq' and Vd' respectively.

The control loop R also comprises an angle error compensator 6 including a measurement input connected to the angle measurement sensor 2 and a signal processing unit 61 for transforming electrical signals received from the position sensor 2 into an angle measurement, referred to as the measured angle θsensor.

The angle error compensator 6 further comprises a current return input, connected to the return current output of the calculation unit 5 receiving the return quadrature current Iq and the return direct current Id, a voltage setpoint input connected to the voltage setpoint output of the current controller 42 receiving the setpoint voltage V' and an adjusted angle output θcontrol connected to the adjusted angle input of the calculation unit 5. The angle error compensator 6 comprises an adjusted angle calculator 62 (a calculation unit) for determining the adjusted angle θcontrol from the direct voltage Vd', the quadrature voltage Vq', the return quadrature current Iq, the return direct current Id, an electrical rotor speed $\omega_{elec}$ calculated from the calculated speed of rotation N by the measured angle measurements θsensor of the rotor and a predetermined number corresponding to the number P of pole pairs at the rotor, a quadrature inductance Lq.

FIG. 2 shows a block diagram of the calculation of the angle error compensator 6 and FIG. 3 represents a schematic representation of command steps of a method for automatically setting the angular position sensor 2 according to one example of a first embodiment of the invention. The automatic current loop steps are not represented in FIG. 3 but are described below.

In this first embodiment, the rotor of the electric motor 1 of the electric machine M can be decoupled from the body of the turbomachine to run idle.

The method for automatically setting the angular position sensor 2, according to this embodiment, is carried out each time the electric machine M is started up, starting by decoupling the rotor from the body of the turbomachine. The start-up may be derived, for example, from a setpoint I #received from a control unit of the turbomachine. In this example, the method comprises a first speed-based position sensor error identification part E1 comprising a first command step 1E of forcing the setpoint I #received to zero, i.e. the quadrature current Iq #and direct current Id #to 0, and a second step 2E of calculating a command of the inverter converter C in order to rotate the armature rotor of the electric motor 1 at a predetermined speed $N_n$ constantly. The first speed-based position sensor error identification part E1 is started again several times by changing the predetermined speed $N_n$, here in this embodiment by incrementing it, the index n represents the number of times of the speed-based position sensor error identification part E1 during this method. For example the first predetermined speed $N_{n=1}$ is equal to 100 rpm and on the second time of the speed-based position sensor error identification part E1, the PWM command is calculated so that the speed of rotation N of the rotor shifts from the first predetermined speed $N_{n=1}$ to the second predetermined speed $N_{n=2}$. The method therefore comprises a first current loop step consisting of calculating a voltage setpoint V' and transforming it into a pulse width modulation PWM command by the calculation unit 5 which transmits it to the inverter converter C which supplies power by transforming the DC current of the DC bus into three (modulated) alternating currents Iu Iv, Iw of a three-phase system, for the three phases UVW in this example of the stator of the electric motor 1 so that the rotor has a speed of rotation N=to the predetermined speed of rotation Nn.

The speed-based position sensor error identification part E1 of the method further comprises a second current loop step, of measuring the currents of the phases Iu, Iv, Iw by the current measurement means 3 and transforming them in a Park reference frame, into return quadrature current Iq and return direct current Id, taking account of the value of a calculated angle θsensor adjusted, explained next.

The speed-based position sensor error identification part E1 comprises a third step 3E comprising a sub-step not represented of calculating an electrical rotor speed $\omega_{elec}$ by multiplying the number p of rotor pole pairs (predetermined) by the predetermined mechanical speed.

The third step 3E comprises a sub-step not represented of calculating the voltage setpoint V' by the controller during a period t, as a function of the setpoint current comprising forcing the setpoint direct current to 0 and from the return quadrature current Iq and the return direct current id, the return currents measured and transformed by the Park transformation at this constant predetermined speed of rotation Nn.

The third step 3E further consists in comparing during the period t the direct voltage Vd' of the voltage setpoint V' with a value of opposite sign, the value being equal to the calculated electrical speed ωelec multiplied by a quadrature inductance Lq multiplied by the quadrature current Iq, and comparing the quadrature voltage Vq' of the voltage setpoint V' with a first value equal to the calculated electrical speed of the rotor $\omega_{elec}$ multiplied by a predetermined value of corresponding to the flux of the rotor magnets.

The adjusted angle calculator 62 can also calculate a first value equal to the product of the calculated electrical speed $\omega_{elec}$, the quadrature inductance Lq and the quadrature current Iq.

The adjusted angle calculator 62 further calculates a second value of the calculated electrical speed $\omega_{elec}$ multiplied with a predetermined value $\varphi_f$ corresponding to the rotor magnet flux. The adjusted angle calculator 62 represented in FIG. 2 allows calculation of the angular difference value Δθ between the adjusted angular position θcontrol and the angular position θsensor measured by the position sensor. In particular, the adjusted angle calculator 62 identifies the offset direct axis angular angle $\varepsilon_d$ (error of the measured direct angle) with respect to the direct axis component of the return current vector as well as the offset quadrature axis angular angle $\varepsilon_q$ (error of the measured direct angle) with respect to the quadrature axis component of the return current vector.

In this example, the adjusted angle calculator 62 set forth in FIG. 2 calculates so that the offset direct axis angular angle $\varepsilon_d$ and the offset quadrature axis angular angle $\varepsilon_q$ are each equal to zero.

The adjusted angle calculator 62 set forth in FIG. 2 therefore comprises in this example a summer 620 for performing comparison by receiving at a non-inverting input a value 0 and another non-inverting input the sum of the direct voltage Vd' and the value of the first product. As in this embodiment, the setpoint is to have the return direct current Id and the return quadrature current Iq equal to zero, the adjusted angle calculator 62 can also compare Vd' to the value 0 since the product described above is equal to zero. The quadrature inductance Lq does not vary unless the return quadrature current Iq is very large, as in this example, the return quadrature current Iq=0 or close to zero if error, the quadrature value here may be a predetermined value.

In this example, the adjusted angle calculator 62 therefore further comprises a summer 621 for carrying out comparison by receiving at the non-inverting input a value 0 and at the non-inverting input the sum of the quadrature voltage Vq' and the second value calculated. According to another example not represented, the adjusted angle calculator 62 comprises a summer comprising at the non-inverting input the quadrature voltage Vq' and at the inverting input the second value calculated.

The adjusted angle calculator 62 can therefore determine a position angle of the rotor called the estimated angular position θcontrol and therefore an angular difference value Δθ between the adjusted angular position θcontrol and the angular position θsensor measured by the position sensor.

Indeed, it is known that the torque $$T_{em} = \frac{3}{2}p[\varphi_f i_q - (L_q - L_d)i_d i_q]$$

as the torque is zero (idle machine so Iq=0), in the event of angular error measured by the position sensor 2, and assuming negligible voltage drop across the stator resistors, the direct voltage Vd' and quadrature voltage Vq' are equal to the following formula:

$$V_{d'} \approx -\omega_{elec}(L_q i_q + \varphi_{PM}\Delta\theta)$$

$$V_{q'} \approx \omega_{elec}((\varphi_f + L_d i_d) - L_q i_q\Delta\theta)$$

Since Id has been forced to 0, Δθ can be determined therefrom.

$$\Delta\theta = \frac{1}{2}\left[\left(k_p + \frac{k_i}{s}\right)\varepsilon_d + \left(k_p + \frac{k_i}{s}\right)\varepsilon_q\right]$$

with $\varepsilon_d=\omega_{elec}L_q i_q+V_{d'}$ and $\varepsilon_q=-\omega_{elec}\varphi_f+V_{q'}$ and $k_p$, $k_i$ are the gains of the proportional integral type corrector used to cancel the error $$\left(X_{d'}^{\#} - X_{d'}\right) \text{ and } \left(X_{q'}^{\#} - X_{q'}\right).$$

Ld is the direct component of the stator inductance in the Park plane,

Lq is the quadrature component of the stator inductance in the Park plane. Whichever controller is used, the setpoint of the direct current component will be derived from the mapping of the optimum direct current component.

Means for determining the quadrature component Lq of the inductance of the synchronous electric motor 1 may use values of the return direct current Id and return quadrature current Iq components and maps of the electric motor 1.

The speed-based position sensor error identification part E1 of the method for automatically setting the angular position sensor 2 therefore comprises a fourth step 4E of calculating the angular difference value Δθ between the adjusted angle θcontrol and the angle θsensor measured by the position sensor 2.

It can thus be seen in FIG. 2, that in this example, the adjusted angle calculator 62 further comprises a first and a second integral proportional type corrective controller, 624, 625 at the output of the summers 620, 621 respectively of the first and second comparison, as well as a summer 626 and a multiplier 627 by 0.5 for averaging the difference values.

The speed-based position sensor error identification part E1 therefore comprises a fifth step 5E of calculating the adjusted angle θcontrol by adding the angular difference value Δθ to the measured angle θsensor.

The angle error compensator 6 therefore comprises a summer 63 of the measured angle θsensor and the angular difference value Δθ to obtain the adjusted angle θcontrol.

Thus, at the output of the angle error compensator 6, the calculation unit 5 receives the adjusted angle θcontrol to perform the direct and inverse Park transformations described previously in the current loop.

In this example of this embodiment, the angle error compensator 6 comprises a memory 65 storing the angular difference value Δθ as well as the corresponding predetermined speed $N_n$. The method therefore comprises a step of recording the angular difference value Δθ and the corresponding predetermined speed value Nn, here in this example $N_n = K*n$ i.e. 100 rpm*n.

In addition, in this example of this embodiment, the method for automatically setting the angular position sensor 2 checks that the predetermined speed $N_n$ is not equal to half the maximum speed NMax of the rotor of the electric motor 1 and in that the method repeats the previously described steps of the speed-based position sensor error identification part E1 by incrementing the speed of rotation N in a predetermined manner. Here in this example, the speed-based position sensor error identification part E1 is repeated several times, each time reducing the predetermined speed of rotation $N_n$, herein by the value K, for example 100 rpm. The number of times (the index n) that the speed-based position sensor error identification part E1 is performed is therefore equal to the max speed NMax divided by K.

The value of the speed of rotation N is therefore increased by 100 rpm until it reaches a predetermined value NMax. In this example, the predetermined NMax value is equal to half the predetermined maximum rotor speed. Performing the speed-based position sensor error identification part E1 at different speeds by increasing it enables the calculated angular difference to be refined.

The compensator 6 comprises a summer 63 receiving at the non-inverting input the angle measurement θsensor delivered by the processing unit 61 and, at the non-inverting input, the angular difference Δθ for calculating a calculated estimated angle θcontrol and transmitting it to the calculation unit 5.

The current loop steps described above are simultaneous due to the fact that they are in a closed control loop.

In this example of this embodiment, the method for automatically setting the angular position sensor 2 further comprises a torque-based position sensor error identification part E2 when the predetermined speed is equal to or greater than the predetermined value NMax.

The torque-based position sensor error identification part E2 requires a load to be coupled to the rotor shaft of the electric machine 1.

The torque-based position sensor error identification part E2 comprises a first step 6E of calculating a PWM command of the inverter C to supply the x phases in order to rotate the armature rotor at a speed for the calculation by the predetermined torque Ni constantly, the command being calculated by the calculation unit by calculating the speed according to the position measurements by the position sensor 2.

This torque-based position sensor error identification part E2 comprises the steps of the current loop described above: measuring the currents Iu, Iv, Iw of the phases and transforming them in a Park reference frame, into quadrature current Iq and direct current Id, taking account of the calculated adjusted angle, but also calculating an electrical speed of the rotor $\omega_{elec}$ by multiplying the number of pole pairs by the predetermined speed.

This torque-based position sensor error identification part E2 comprises a step 7E of imposing on the predetermined speed Ni at the input of the current controller 4, a setpoint quadrature current Iq #to a first predetermined value Ik other than zero, and a setpoint direct current Id #to a zero value 0, from the measured currents transformed by the Park transformation.

The torque-based position sensor error identification part E2 comprises a step 8E of comparing, at the second predetermined speed Ni constantly, the value of the direct setpoint voltage Vd' with the first value equal to $\omega_{elec}L_qi_q$. The quadrature inductance Lq can be calculated or determined or can be predetermined. The angle error compensator 6 may use the adjusted angle calculator 62 to perform this step in a similar way to the speed-based position sensor error identification part E1. Thus step 8E further comprises comparing at the second constant predetermined speed, that at the output of the current controller, the value of the quadrature setpoint voltage Vq' is equal to the second calculated value $\omega_{elec}*\varphi_f$.

The torque-based position sensor error identification part E2 comprises a step 9E of calculating the angular difference Δθ with the adjusted angle calculator 62 while the rotor rotates at the second predetermined speed Ni constantly according to these comparisons, and recording the angular difference Δθ with the predetermined speed Ni.

The automatic setting method repeats the current-based angular position sensor 2 setting checking part of the a predetermined number of times by incrementing, by predetermined steps, the predetermined value Ik of the setpoint quadrature current Iq #until the return quadrature current Iq is equal to a final predetermined value corresponding in this example to the predetermined maximum return quadrature current value Iqmax. This allows the angular difference Δθ calculated to be refined and recorded at each current-based angular position sensor 2 setting checking part.

As the angular difference Δθ allows to have an adjusted current θcontrol in the current loop, the angular difference Δθ tends towards 0 and is checked, if the angular difference Δθ is different from 0 when the return quadrature current Iq is equal to a final predetermined value, the automatic setting method repeats a predetermined number of times the current-based angular position sensor 2 setting checking part from the beginning, otherwise it shifts to a normal mode of operation of the PWM command of the electric motor 1.

The method for controlling an electric machine of a turbomachine in a so-called normal mode comprises the steps of the current loop, using the direct current Id #and quadrature current Iq #setpoint and the return quadrature current Iq and the return direct current Id calculated by the calculation unit 5 by the mathematical method of the Park transform of the measured currents Iu, Iv, Iw, according to an angle B comprising measuring an angle θsensor added to a value according to a recorded angular difference Δθ.

FIG. 5 represents an example of the calculation of the angle B which is equal to the value of the measured angle θsensor added to an angular difference mean (average) Δθmean calculated from the angular difference values Δθ recorded in the memory 65.

FIG. 4 shows a second embodiment of the method for automatically setting the angular position sensor 2. In contrast to the first embodiment, this method makes it possible to automatically set the angular position sensor 2 of the rotor of the electric motor 1, the rotor of which is coupled to a body of a turbomachine. The body generates a moment of inertia, so the electric machine does not actually run idle.

In this second embodiment of the method for automatically setting the angular position sensor 2, the method comprises, as in the first embodiment, a speed-based position sensor error identification part 1E' except in that it is different in that the predetermined speed of rotation N'n is the maximum speed of rotation Nmax and in that each time the method repeats the speed-based position sensor error identification part 1E', the value of the predetermined speed N'n is reduced, for example here by a constant k.

In this example of this embodiment the first step 1E' is calculating a PWM command of the inverter converter C) in order to rotate the armature rotor at a predetermined speed N'n constantly, i.e. the first time at the first predetermined speed N'1 (the index n being=1).

The second step 2E' is the step of calculating a voltage setpoint V' for a period t in order to obtain a direct current value Id equal to 0 from the return quadrature current Iq and the return direct current Id transformed by the Park transformation, and is performed by imposing a quadrature current setpoint Iq #equal to zero and a setpoint direct current Id #equal to zero.

In other words, in this second embodiment, the first step 1E' and second step 2E' correspond respectively to the second step and the first step of the first embodiment, except in that the first predetermined speed N'1 is the maximum speed Nmax in this embodiment whereas, conversely, in the first embodiment, the first predetermined speed N1 is the lowest of the predetermined speeds Nn.

The third step 3E', the fourth step 4E', and the fifth step 5E' of this second embodiment correspond to the third comparison step 3E, the fourth step 4E of calculating the angular difference value $\Delta\theta$, and the fifth step 5E of calculating the adjusted angle $\theta$control of the first embodiment respectively.

As previously explained, in this embodiment, the speed-based position sensor error identification part E1' is repeated several times by reducing the predetermined speed of rotation N'n each time, herein by a value k, for example 200 rpm. The number of times the speed-based position sensor error identification part E1' is therefore performed is equal to the max speed divided by k.

When the predetermined speed of rotation N'n is equal to zero (the index n therefore has a value equal to Nmax/k), a method for commanding the electric motor 1 in normal mode can be started for calculating the command of the inverter converter C for supplying the phases of the stator of the electric motor 1 according to the received direct current Id #and quadrature current Iq #setpoints and the return quadrature current Iq and return direct current Id values calculated by the calculation unit 5 by the mathematical method for the Park transform of the measured currents Iu, Iv, Iw, according to an angle B comprising the value of the measured angle $\theta$sensor added to a correction value according to a recorded angular difference $\Delta\theta$. The correction value may be as in the first embodiment, the mean of the angular difference values $\Delta\theta$mean stored in the memory 65 but may be according to another example, the angular difference value $\Delta\theta$ calculated recorded corresponding to the predetermined speed $N_n$ recorded closest to the measured instantaneous speed N.

Unless otherwise specified, a same element appearing in different figures has a single reference.

The invention claimed in:

1. A method for automatically setting an angular position sensor measuring an angle corresponding to the mechanical angular position of an armature rotor with a magnet forming P pole pairs relative to a stator comprising X phases of a multiphase synchronous electric motor of an electric machine of an aircraft propulsion unit, the position sensor comprising a movable part mounted to the armature rotor and a fixed part relative to the stator, the method using a control loop to transmit a command to an inverter converter of the electric machine to supply the phases of the stator, the control loop comprising a current controller comprising a setpoint input to receive a current setpoint comprising a setpoint quadrature current corresponding to a component on the quadrature axis of the setpoint current vector and a setpoint direct current corresponding to a component on the direct axis of the setpoint current vector, to deliver a voltage setpoint comprising a quadrature and direct voltage with an angle, a calculation unit to calculate a direct Park and inverse Park transformation, for transforming the voltage setpoint into a command of the inverter converter, an angle error compensator to identify an angle error and compensate for it, the method being characterised in that it comprises a speed-based position sensor error identification part, the method comprising:

calculating the command of the inverter converter in order to rotate the armature rotor at a predetermined mechanical speed constantly, measuring the phase currents and transforming them in a Park reference frame, into the return quadrature current and the return direct current, taking account of an adjusted angle calculated, calculating an electrical speed ($@_{elec}$) of the rotor by multiplying the number p of pole pairs by the predetermined mechanical speed, calculating a voltage setpoint for a period t during which the rotor rotates at the predetermined mechanical speed by imposing a direct current value equal to 0 on the current controller, identifying an offset error of the direct component on its direct axis by comparing during the period t the direct voltage of the voltage setpoint with a value of opposite sign, the value being equal to the electrical speed calculated multiplied by a quadrature inductance multiplied by the return quadrature current, identifying an offset error of the quadrature component on its quadrature axis by comparing, during the period t, the quadrature voltage of the voltage setpoint with a first value equal to the electrical speed of the rotor calculated multiplied by a predetermined value corresponding to the flux of the rotor magnets, calculating an angular difference value from these direct and quadrature angular offset errors identified, determining at the period t, an adjusted angle as a function of the angular difference value calculated, and the measured angle value, transmitting the return quadrature current and the return direct current according to the adjusted angle to the current controller.

2. The method for automatically setting an angular position sensor according to claim 1, wherein calculating the angular difference value is made according to this formula:

$$\Delta\theta = \frac{1}{2}\left[\left(k_p + \frac{k_i}{s}\right)\varepsilon_d + \left(k_p + \frac{k_i}{s}\right)\varepsilon_q\right]$$

with $\varepsilon_d = \omega_{elec}L_q i_q + V_d$ corresponding to the comparison to identify the angular error of the direct component and $\varepsilon_q = -\omega_{elec}\varphi_f + V_q$, corresponding to the comparison to identify the angular error of the quadrature component, Lq is the quadrature inductance, $k_p$, $k_i$ are the gains of the proportional integral type corrector used to cancel the error between respectively the setpoint quadrature current and the return quadrature current and respectively the setpoint direct current and the return direct current.

3. The method for automatically setting an angular position sensor according to claim 1, wherein the rotor is coupled to a shaft of the propulsion unit comprising a moment of inertia, wherein during the period t, the value of the direct voltage is imposed to be equal to 0.

4. The method for automatically setting an angular position sensor according to claim 1, wherein the rotor is coupled to a body of a turbomachine, and wherein the speed-based position sensor calibration part is started again a number X times at different predetermined speeds and wherein each time a speed-based position sensor calibration part is carried out, the value of the angular difference between the adjusted angle and the measured angle and the corresponding predetermined mechanical speed are recorded.

5. The method for automatically setting an angular position sensor according to claim 4, wherein the first predetermined mechanical speed is the highest of the predetermined speeds, for example the maximum speed of rotation of the rotor, and wherein the method repeats the speed-based position sensor calibration part by decreasing the mechanical speed of the rotor by a predetermined difference until the rotor stops rotating.

6. The method for automatically setting an angular position sensor according to claim 1, wherein the electric machine can run idle, for example by disengaging from a turbomachine shaft, the method comprising:

in the step of calculating a command of the inverter converter of the speed-based position sensor error identification part, the predetermined mechanical speed of rotation is incremented in a predetermined manner each time the method starts again the speed-based position sensor error identification part, in the speed-based position sensor error identification part, a step of recording each angular difference value between the adjusted angle value calculated and the measured angle.

7. The method for automatically setting an angular position sensor of a multiphase electric machine according to claim 6, further comprising after the speed-based position sensor calibration part a current-based angular position sensor setting checking part comprising the following steps of:

calculating a command of the inverter converter to supply the X phases in order to rotate the armature rotor at a second predetermined mechanical speed constantly, measuring the currents of the phases and transform them in a Park reference frame, into the return quadrature current and the return direct current, taking account of the value of the adjusted angle calculated, calculating an electrical rotor speed by multiplying the number of pole pairs by the second predetermined mechanical speed, imposing on the predetermined mechanical speed, at the input of a current controller, a setpoint quadrature current to a first predetermined value other than zero, and a setpoint direct current to a zero value, determining the quadrature inductance, comparing at the second predetermined mechanical speed constantly, that at the output of the current controller, the value of the direct setpoint voltage is equal to a value of opposite sign, the value being equal to the product of the electrical speed calculated, the quadrature inductance and the quadrature return current, comparing at the second predetermined mechanical speed constantly, that at the output of the current controller, the value of the setpoint quadrature voltage is equal to the product of the electrical speed calculated times the predetermined value corresponding to the flux of the rotor magnets, calculating the angular difference between the adjusted angle calculated and the measured angle, while the rotor rotates at the second predetermined mechanical speed constantly according to these comparisons, and recording it, wherein the automatic setting method repeats a predetermined number N of times the current-based angular position sensor setting checking part, each time incrementing the predetermined value of the setpoint quadrature current in a predetermined manner until a predetermined maximum return quadrature current value is obtained.

8. A method for commanding an electric machine of a turbomachine, wherein, each time the electric machine is started up, the method comprises the method for automatically setting an angular position sensor according to claim 1, and wherein the method further comprises a normal mode of commanding the electric motor comprising a step of calculating the command of the inverter converter for supplying the phases of the stator of the electric motor according to the setpoint received from the values of return quadrature current and return direct current, the calculation unit performing the calculations by the mathematical method of the direct or inverse Park transform, according to an angle B comprising the measured angle added to a correction value according to a recorded angular difference.

9. The method for commanding a turbomachine comprising an electric machine, according to claim 8, wherein the correction value may be equal to the recorded angular difference value calculated corresponding to the recorded mechanical predetermined speed closest to the mechanical instantaneous speed measured.

10. The method for commanding a turbomachine comprising an electric machine, according to claim 8, further comprising a step of calculating a mean of the recorded angular difference values and wherein the correction value is equal to the mean of the recorded angular difference values.

11. A control loop of an electric machine of a turbomachine to calculate a command of an inverter converter for an electric motor comprising a field stator having stator coilings forming X phases, an armature rotor with a magnet having p pole pairs and a shaft to be coupled to a turbomachine body, an inverter converter comprising a command input and outputs each connected to one of the X phases to command the electric motor, a measuring means of the current delivered on the X phases and a position sensor comprising a rotatably movable part mounted integral with the rotor shaft and a fixed part integral with the stator, the control loop being configured to carry out the method for commanding a turbomachine comprising an electric machine, according to claim 8, in order to calculate a command of the inverter converter, the control loop comprising:

a current controller comprising:

a direct and quadrature current setpoint input, a quadrature and direct current return input, a voltage setpoint output, a calculation unit for performing a Park and an inverse Park transformation comprising:

a direct and quadrature voltage setpoint input, connected to the voltage setpoint output of the current controller, a measured current input, connected to the measurement means, an adjusted angular position input, a current return output to output a return quadrature current and a return direct current, the current return output being connected to the return input of the current controller, a command output to be connected to the command input of the inverter converter, an angle error compensator, comprising:

a measurement input to be connected to the angle measurement sensor, a current return input, connected to the current return output of the calculation unit to receive the return quadrature current and the return direct current, a voltage setpoint input connected to the voltage setpoint output of the controller to receive the direct and quadrature setpoint voltage, an adjusted angle output connected to the adjusted angular position input of the calculation unit an adjusted angle calculator configured to:

calculate an angular difference value as a function of the current measurements and the voltage setpoint and rotor speed, to identify on the one hand the angular error on the direct axis and on the other hand the angular error on the quadrature axis, calculate an adjusted angle from the angular difference value.

12. An electric machine comprising the rotor, the stator, the position sensor and the inverter converter comprising a command input and outputs each connected to one of the X phases for commanding the electric motor and the control loop according to claim 11.

* * * * *